UNITED STATES PATENT OFFICE.

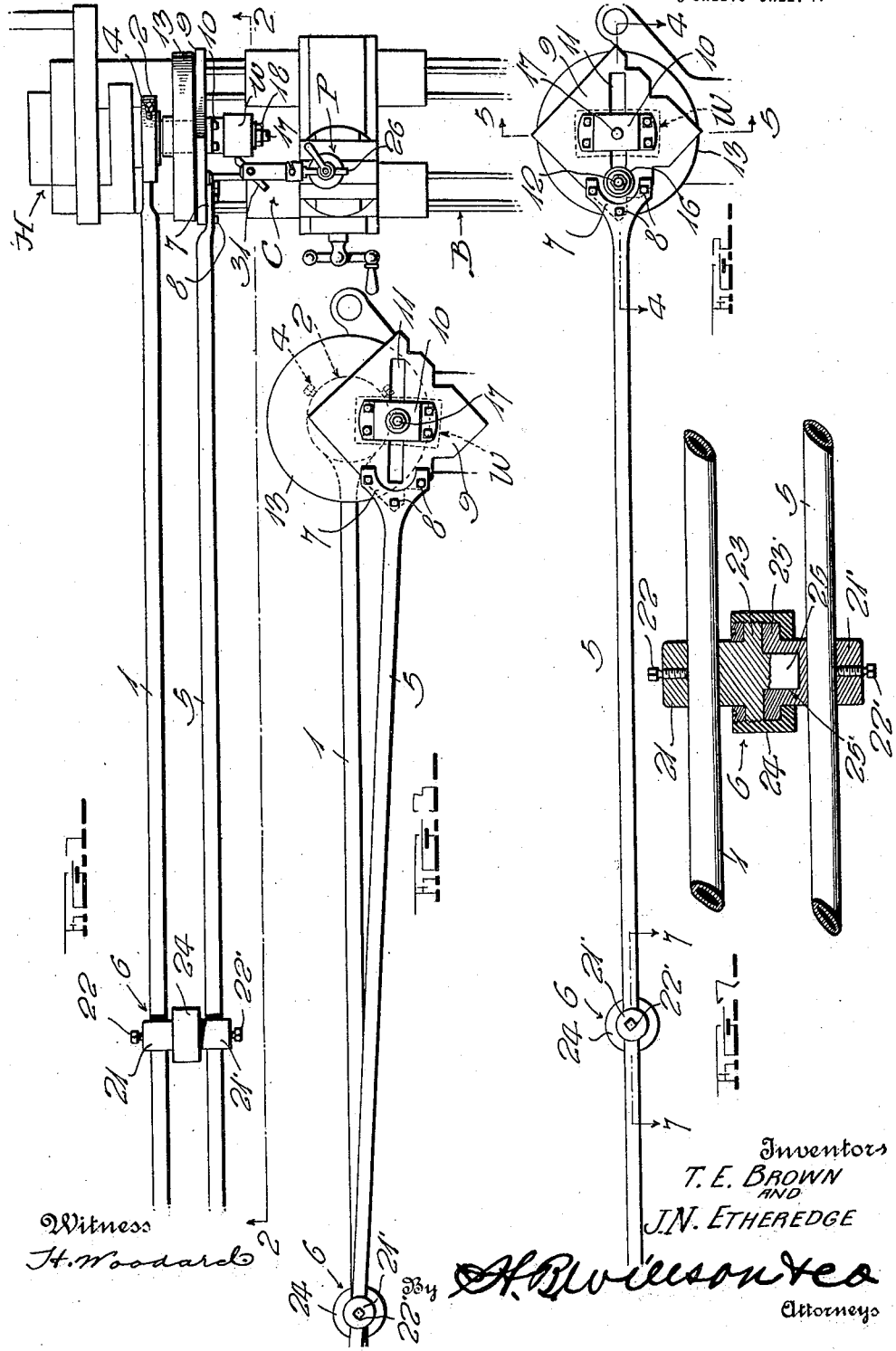

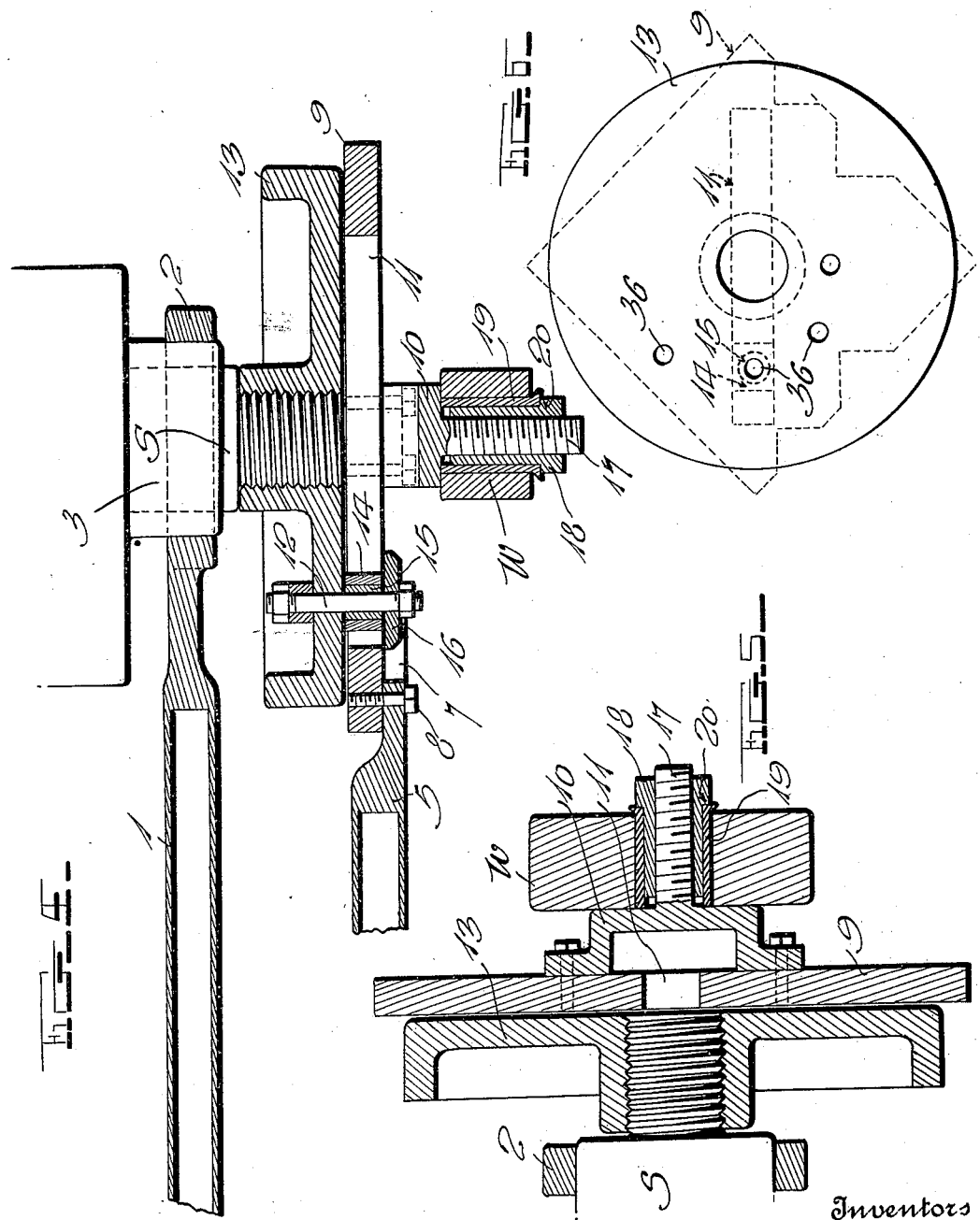

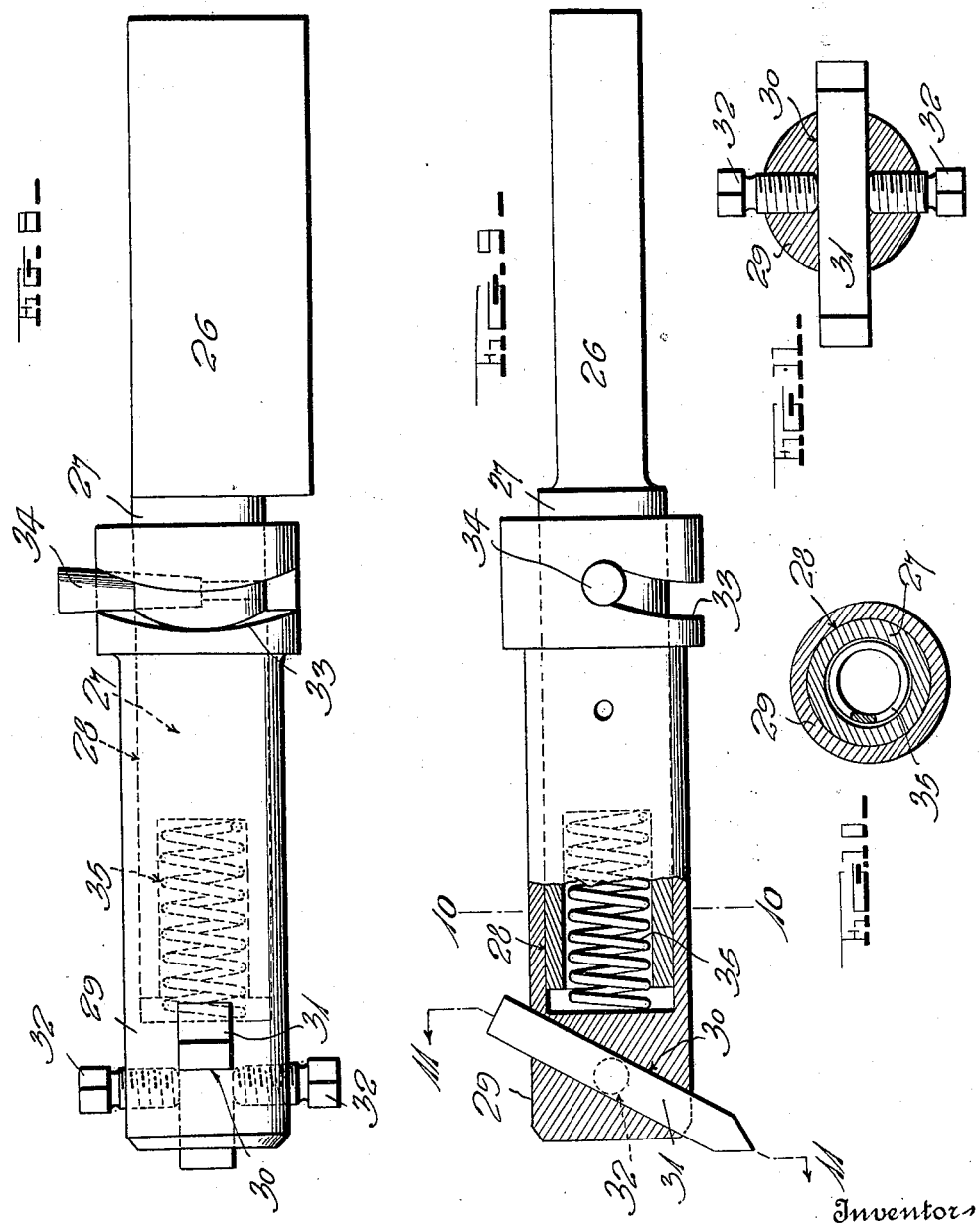

THOMAS EUGENE BROWN AND JAMES NEWTON ETHEREDGE, OF MACON, GEORGIA.

ATTACHMENT FOR LATHES.

1,407,249.  Specification of Letters Patent.  Patented Feb. 21, 1922.

Application filed September 23, 1920. Serial No. 412,241.

*To all whom it may concern:*

Be it known that we, THOMAS E. BROWN and JAMES N. ETHEREDGE, citizens of the United States, residing at Macon, in the county of Bibb and State of Georgia, have invented certain new and useful Improvements in Attachments for Lathes; and we do declare the following to be a full, clear, and exact description of the invention, such as will enable others skilled in the art to which it appertains to make and use the same.

Our invention relates to metal working machines and more particularly to those adapted for cutting curvatures on any required radius, and the present embodiment of such invention relates more particularly to an attachment for lathes to permit curvatures on radii longer than the swing of the lathe, to be cut thereby. The device is intended principally for cutting link blocks for the valve gears of locomotives and other engines, but it may be used to equal advantage for cutting curvatures on other kinds of work.

The principal object of the invention is to provide an extremely simple and comparatively inexpensive, yet a highly efficient and reliable arrangement of parts which will permit different curvatures to be cut, novel provision being made whereby a work-holder is moved on an arcuate path with respect to an appropriate cutting tool.

A further object is to provide for changing the arc on which the work-holder travels, whereby different curvatures may be imparted to the work as occasion may require.

Yet another object is to embody the invention in the form of an attachment which may be used on ordinary lathes, without the necessity of making any alterations whatever in the construction thereof.

A still further object is to provide a novel form of tool-holder which is reversible by merely inverting the same, whereby to allow cutting of either the outer or the inner curved side of the work, novel provision being made to prevent the tool from dragging excessively on the work as it returns after each cut.

With the foregoing in view, the invention resides in the novel construction and combination of parts hereinafter described and claimed, the descriptive matter being supplemented by the accompanying drawings.

Figure 1 is a top plan view of our invention applied to a lathe.

Figure 2 is an elevation of the work-holder and its carrying and operating means, looking in the direction indicated by the arrows of line 2—2 of Fig. 1.

Figure 3 is a view similar to Fig. 2 but showing a different position of parts.

Figure 4 is a horizontal sectional view as indicated by line 4—4 of Fig. 2.

Figure 5 is a vertical transverse sectional view cut on line 5—5 of Fig. 2.

Figure 6 is a side elevation of the face plate which carries the wrist pin for oscillating the work-holder and its carrying arm.

Figure 7 is a detail horizontal sectional view taken on line 7—7 of Fig. 2.

Figure 8 is a side elevation of the tool-holder.

Figure 9 is a top plan view of the holder shown in Fig. 8.

Figures 10 and 11 are detail transverse sectional views as indicated by the lines 10—10 and 11—11 of Fig. 9.

In the drawings above briefly described, we have shown our invention in connection with a common type of lathe, said lathe including the usual bed B, carriage C, tool-post P, head-stock H, and live-spindle S. Secured in any preferred manner to the lathe at the head end thereof, and extending laterally from said lathe, is a rigid arm 1 of any adequate length, the attachment of said arm to the lathe being preferably effected by providing one end of said arm with a collar 2 which surrounds one of the bearings 3 of the spindle S, set-screws or the like 4 being employed for securing said collar non-rotatably on the bearing. An oscillatory arm 5 is disposed in substantially parallel relation with the arm 1 and by means of a suitable connection 6, is pivoted to said arm 1 at its outer end, while the inner end of said oscillatory arm 5 carries a work-holder, and means are provided for oscillating said work-holder and arm 5 as the spindle S rotates.

In the present showing, the inner end of the oscillatory arm 5 is forked as indicated at 7 and is secured by bolts or the like 8 to a preferably rectangular head-plate 9, said head-plate being disposed in a vertical plane and having a laterally extending yoke 10 which coacts with any appropriate clamping means in forming the work-holder above referred to. The yoke 10 spans a slot 11 in said plate 9 and as seen most clearly in Fig. 4, a wrist-pin 12 on a face-plate 13, is operable within said slot, said face-plate being threaded on the spindle S in the usual way, whereby to be rotated with said spindle. It thus follows that as the wrist-pin 12 is driven, it moves within the slot 11 to oscillate the head-plate 9 and the arm 5 upon the pivotal connection 6, thereby moving the work-holding yoke 10 vertically on an arc whose radius is controlled by the distance between the center of the yoke and the center of the connection 6. The head-plate 9 is in substantial contact with the outer side of the face-plate 13 and the wrist-pin 12 of said face-plate is preferably provided with a shoe 14 and a bushing 15 within said shoe as shown clearly in Fig. 4. The shoe travels longitudinally in the slot 11 as the wrist-pin 12 turns in the bushing 15, and outward movement of the plate 9 from these parts is prevented by a suitable stop-collar 16.

Any adequate provision could of course be made for clamping the work W to the yoke 10, but I prefer that said yoke be provided with a central stud 17 upon which a tubular nut 18 is threaded, said nut being receivable in an opening in the work as shown in Fig. 4. If desired, this opening may be bushed as indicated at 19. When the nut 18 is tightened, the work is tightly clamped against the yoke 10 by a shoulder 20 on said nut.

The connection 6 above referred to, may be of any adequate form, but in Fig. 7 we have shown the construction which we have used to advantage. A pair of slides 21 and 21' are mounted respectively on the arms 1 and 5 and may be secured in adjusted position thereon by means of set-screws or the like 22 and 22'. The slides 21 and 21' extend inwardly into abutting relation with each other and are here of cylindrical form, being provided with outstanding flanges 23 and 23' around which a suitable collar 24 extends to hold the slides together while permitting turning of the slide 21' with respect to the slide 21. In most instances, we prefer to provide one of the slides with a journal 25 rotatably received in the socket 25' in the other slide. This connection serves to steady the connection 6 and prevents any lateral vibration thereof.

By constructing the connection 6 in or substantially in the manner shown and described, it may be adjusted to any desired point along the arms 1 and 5, thus changing the radius on which the work-holder 10 swings, with the result that the curvature imparted to the work W by the tool held in the post P, may be made to meet any demands within the capacity of the machine.

As showing the preferred form of tool which we have successfully used in connection with our invention, attention is directed more particularly to Figures 8 to 11. In these figures, the numeral 26 designates a rear shank section adapted to be held horizontally in the tool-post P. The front end of this shank, that is the end adjacent rather than remote from the work, is of cylindrical form as shown at 27 and is received within a longitudinal opening 28 in the inner end of a front shank section 29. This front section is provided with a transverse oblique bore 30 in which a suitable cutting tool 31 may be secured by set-screws or the like 32. When the device is held in the tool-post P as shown in Fig. 1, the tool 31 is in position to operate upon the work W as such work is alternately moved upwardly and downwardly on the arc controlled by the position of the connection 6. When cutting the curvature on one side of the work, the tool 13 must necessarily occupy a position reversed with respect to that assumed when cutting the other side. Due to the novel construction described below, this reversal of the tool 31 is effected by merely inverting the front shank section 29.

At its rear end, the shank section 29 is provided with a longitudinally curved transverse slot 33 which extends throughout one-half of the circumference of said section and is of uniform curvature from both ends of its center. A rigid pin or other suitable projection 34 extends from the cylindrical end 27 of the rear shank section 26 into the slot 33 and when the shank section 29 is in either of its two relatively inverted positions, said pin or the like strikes an end of the slot and thereby holds the shank section 29 to properly position the tool 31 for cutting. The pin and slot connection described also functions as means to allow the tool 31 to tilt on its return movement over the work after each cutting stroke so that it will not drag excessively on said work. A coil-spring 35 or other appropriate spring means is employed for normally exerting a forward thrust on the shank section 29. When this section is turned slightly by tilting of the tool 31 as the latter returns over the work, the cam formation of the slot 33 shifts the section 29 rearwardly to some extent thereby placing the spring 35 under tension. As soon, however, as the cutting tool 31 reaches the end of its idle stroke and moves slightly beyond the work, said spring 35 comes into play to again project the shank section 29 forwardly, the slot 33 and the pin 34 in the meantime serving to turn said section to the position previously occupied, whereby the tool 31 is disposed for proper cutting as the work W is moved across said tool. This operation takes place, whether the tool is operating on the outer or the inner curved face of the work.

The stroke of the work-holder 10 may be varied according to the length of the work, by changing the position of the wrist-pin 12, and for this purpose we have provided the face-plate 13 with a series of openings 35 which are spaced different distances from the center of said face-plate. By positioning the wrist-pin 12 in the proper opening 36, the length of stroke may be varied as required.

In operation, the work W, for instance, a link block for a locomotive valve gear, is clamped to the work-holding yoke 10 and the connection 6 is adjusted along the arms 1 and 5, according to the radius of the curve to be cut upon said link-block. This having been done, the spindle S is driven, with the result that the face-plate 13 and wrist-pin 12 cause vertical oscillation of the arm 5 and the parts carried by the inner end of said arm. The work is thus alternately moved upwardly and downwardly across the cutting edge of the tool 31. Upon each downward stroke of the work, the tool comes into play, but on the upward strokes, said tool is permitted to tilt upwardly, due to the rotatable mounting of the shank section 29 on the section 26. This rotation causes the cam 31 and pin 34 to shift the shank section 29 inwardly against the tension of the spring 35, and the moment the work clears the tool, said spring comes into play to again shift said section 29 forwardly, the cam and pin in the meantime serving to turn the section in question to its initial position, so that the cutter 31 is in readiness for making the next cut. When one curved side of the work is completed, the tool-post P may be adjusted on the carriage C, to dispose the tool at the opposite side of the work and when the shank section 29 is now inverted, the tool 31 is positioned for action on said last named side.

The entire arrangement above described is comparatively simple and inexpensive, yet is highly efficient and in every way desirable, and produces much better results than other machines which have been devised for accomplishing the same work. When our invention is embodied in the form of a lathe attachment, it may be quickly and easily attached to or removed from an ordinary lathe, without making any changes whatever in the construction of the latter. We wish it understood however that in some instances the invention may be incorporated at the factory in a complete machine and need not therefore rely on parts of any other machines for its operation.

Since in actual use in a locomotive repair shop, the arrangement shown and described has proven highly efficient, we prefer that this arrangement should be followed. Nevertheless, within the scope of the invention as claimed, numerous changes may well be made.

We claim:

1. In combination, a work-holder having a pivotally mounted carrying arm, a relatively fixed cutting tool adjacent said work-holder, a rotary shaft, and means connecting said shaft and work holder for bodily oscillating said work-holder and its carrying arm to move the work arcuately across the cutting tool.

2. In combination, a work-holder, a pivoted arm having a head carrying said work-holder, said head having a slot, a driven wrist-pin operable in said slot for oscillating the arm and work-holder, and a relatively fixed cutting tool adjacent said work-holder.

3. In combination, a fixed supporting structure, a shaft rotatably mounted thereon, a work-holder, means connecting said work-holder and shaft for successively moving said work-holder in opposite directions, an oscillatory arm fixed to and extending laterally from said work-holder, a rigid arm extending from said support, means pivoting said oscillatory arm to said rigid arm, and a relatively fixed cutting tool adjacent said work-holder.

4. In combination, a work-holder having a pivotally mounted carrying arm, said work-holder being provided with a guide-way, a rotary member having an off-center projection slidably received in said guide-way for oscillating the work-holder and its carrying arm as the shaft rotates, and a relatively fixed cutting tool adjacent said work-holder.

5. In combination, a fixed supporting structure, a shaft rotatably mounted thereon, a work-holder, means connecting said work-holder and shaft for successively moving said work-holder in opposite directions, an oscillatory arm fixed to and extending laterally from said work-holder, a rigid arm extending from said support, means pivoting said oscillatory arm to said rigid arm, and adjustable toward and from said support to vary the arc on which said oscillatory arm swings, and a relatively fixed cutting tool adjacent said work-holder.

6. The combination with a lathe of an arm extending rigidly from said lathe on a line transverse to the live spindle thereof, an oscillatory arm pivoted to said rigid arm and having a work-holder on its inner end adjacent said live spindle, means on said live spindle for oscillating said work-holder and its carrying arm, and a cutting tool on the lathe carriage.

7. The combination with a lathe, of an arm extending rigidly from said lathe on a line transverse to the live spindle thereof, an oscillatory arm pivoted to said rigid arm and having a vertical head-plate on its inner end provided with a work-holder and slot, a face-plate on the aforesaid live spindle having a wrist-pin operable in said slot to oscillate said head-plate and said work-holder with their carrying arm, and a cutting tool on the lathe carriage.

8. A structure as specified in claim 6, said rigid arm having a collar secured around a bearing of the live spindle, said collar forming the means for attaching said rigid arm to the lathe.

9. A structure as specified in claim 6, the pivot of said oscillatory arm being adjustable toward and away from the live spindle of the lathe to vary the arc on which the work holder travels.

10. An attachment for lathes comprising an arm adapted to extend laterally from the head end of the lathe, means for attaching said arm rigidly to the lathe, an oscillatory arm pivoted to said rigid arm at its outer end and having a work-holder on its inner end for disposition adjacent the live spindle of the lathe, and means adapted for mounting on this spindle for oscillating said work-holder and its carrying arm.

11. An attachment for lathes comprising an arm adapted to extend laterally from the head end of the lathe, means for attaching said arm rigidly to the lathe, an oscillatory arm pivoted to said rigid arm at its outer end, said oscillatory arm having a vertical plate on its inner end provided with a work-holder and a slot, a face-plate adapted for mounting on the live spindle of the lathe, and a wrist-pin on said face-plate operable in said slot to oscillate said plate and work-holder with their carrying arm.

12. A structure as specified in claim 10, the attaching means for said first named arm comprising a collar and means for securing said collar around one of the spindle bearings of the lathe.

13. A structure as specified in claim 10, the pivot of said oscillatory arm being adjustable to vary the active length of said arm.

In testimony whereof we have hereunto set our hands.

THOMAS EUGENE BROWN.
JAMES NEWTON ETHEREDGE.